Patented July 10, 1951

2,560,504

UNITED STATES PATENT OFFICE 2,560,504

DEMINERALIZATION OF SUCROSE SOLUTIONS BY ION EXCHANGE

Harold M. Day, Cos Cob, and Arthur C. Wrotnowski, Jr., Greenwich, Conn., assignors to American Cyanamid Company, New York, N. Y., a corporation of Maine No Drawing. Application August 7, 1947, Serial No. 767,334

11 Claims. (Cl. 127—46)

This invention relates to the purification of aqueous solutions containing sugar and more particularly, to an ion exchange process for the purification of aqueous solutions containing sugar in which inversion of sucrose present in the solution is entirely eliminated or substantially reduced.

A great deal of work has been done in the past on ion exchange processes for purifying aqueous sugar solutions. Defecated or clarified sugar juices, i. e., sugar juices to which lime has been added and the resulting flocculated and precipitated impurities removed by settling and by filtration, have been treated first with a hydrogen-activated cation exchange material and then with an alkali-activated anion exchange resin, with or without the use of a decolorizing carbon, to remove inorganic salts and organic impurities. Further development in this field provided a more satisfactory process according to which suspended matter in an undefecated sugar solution was removed by filtration, centrifuging or similar means and the resulting sugar solution then passed through a plurality of hydrogen-activated cation and alkali-activated anion exchangers. While this latter method possesses definite advantages over the former, both processes ultimately produce a concentrated sugar syrup which may be turbid and which, in addition, may be somewhat colored. Turbidity can be removed by means of decolorizing carbon in some cases, but use of even the uneconomically large amount of carbon usually necessary for this fails to completely remove the color in every case.

More recently, it has been found that if a sugar solution is subjected first to an ion exchange purification process and the demineralized solution then defecated with phosphoric acid and lime, a clear substantially colorless sugar solution is obtained. This solution may be used directly for the crystallization of white sugar, requiring no remelting.

There is, however, a disadvantage inherent in each of the processes mentioned above; namely, inversion of some of the sucrose present in the sugar solution occurs in spite of careful regulation to keep the temperature of the solution as low as possible since inversion is known to be favored by high temperatures. This well-known phenomenon, while termed "inversion" because the mixture of glucose and fructose obtained rotates a plane of polarized light in the opposite direction from sucrose, is in fact a simple hydrolysis reaction which may be effected by acid or the enzyme invertase according to the following equation:

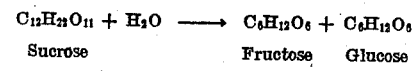

Sucrose          Fructose    Glucose

Inversion is not always undesirable since invert sugar, the term applied to the mixture of glucose and fructose obtained as a result of the hydrolysis, has a sweet taste and may be used for sweetening of edibles. It is often customary, for example, to bring about inversion of about 50% of the sucrose in sugar syrups in order to prevent or inhibit crystallization. The resulting syrups containing a large proportion of invert sugar may be used in the manufacture of confectionery products, bakery products, soft drinks, etc.

Where the crystallization of pure sugar is the object, however, inversion is undesirable and attempts have been made in the past to eliminate or substantially cut down on the sucrose losses due to this reaction. For example, it has recently been found that in an alternate cation-anion multi-bed ion exchange process for the purification of aqueous solutions containing sugar, inversion of sucrose may be reduced somewhat by passing the aqueous sugar solution first through an anion exchanger.

According to the present invention, we have found that inversion of sucrose in aqueous solutions containing sugar may be completely eliminated or substantially reduced in ion exchange purification processes if the cation exchangers are put on an ammonium, rather than on a hydrogen cycle. Inversion of sucrose in an ion exchange sugar purification process drops off as a hydrogen-activated cation exchange resin becomes progressively more inactivated, and no inversion at all takes place if the cation exchange resin is put on a sodium cycle prior to treatment of a sugar solution. In this latter case, of course, neither does the aqueous sugar solution become demineralized since the effluent syrup contains sodium. Apparently, therefore, inversion of an aqueous solution containing sugar is not caused solely by the low acid pH of the solution as it passes through the cation exchanger, but also by an inherent catalytic activity of the resin.

The invention will be described in greater detail in conjunction with the following specific examples. The examples are merely illustrative, and it is not intended that the invention be limited to the details therein set forth.

sugar solution containing 601 P. P. M. measurable cations. It should be noted that no inversion of sucrose is observed at any time during the run.

In a duplicate run but with the cation resin on the hydrogen cycle, the sugar solution of 47.6 Brix at 100 mls. through contained 50.2% invert sugar.

EXAMPLE 2

The resin beds of Example 1 are backwashed and rinsed. The cation bed is regenerated with 15 pounds of ammonium chloride as a 5% aqueous solution per cubic foot of resin and the anion with 10 pounds of sodium hydroxide as a 5% aqueous solution per cubic foot of resin.

A further portion of the pre-heated sugar remelt of Example 1 is passed through the cation and anion resin beds, in that order, at a rate of 1 gal. per min. per cu. ft. of the cation resin. The following observations are made:

| Time (mins.) | Liters through | Brix | Na, P. P. M. | K, P. P. M. | Hardness, P. P. M. | Per Cent Invert (dry basis) | Brom Thymol Blue Alkalinity (P. P. M. as CaCO$_3$) | Capacity (kilograins per cu. ft. as CaCO$_3$) |
|---|---|---|---|---|---|---|---|---|
| raw | ------ | 47.5 | 12 | 6 | 492 | 0.21 | 40 | ------ |
| 123 | ------ | 46.8 | 0 | 0 | 0 | ------ | 725 | ------ |
| 193 | 5.2 | ------ | 0.8 | ------ | ------ | 0.19 | 680 | 5.8 |
| 213 | ------ | ------ | ------ | ------ | ------ | ------ | 680 | ------ |
| 238 | 6.3 | ------ | 0.8 | ------ | ------ | ------ | 630 | 7.03 |
| 253 | 6.9 | 46.85 | 3.5 | 0 | 0 | 0.20 | 550 | 7.7 |
| 273 | 7.3 | ------ | 4.0 | ------ | ------ | ------ | 560 | 8.14 |
| 303 | 7.9 | ------ | 5.5 | ------ | 1.1 | 0.18 | 500 | 8.81 |

EXAMPLE 1

Two glass columns containing, in beds 42 mm. in diameter and 154 mm. deep, 200 mls. of backwashed, drained, and hydrogen-activated cation exchange resin "C," prepared according to the teachings of U. S. Patents Nos. 2,228,159 and 2,228,160, and 200 mls. of backwashed and drained anion exchange resin "A" prepared as described in U. S. Patent No. 2,285,750, respectively, are steam jacketed in order to maintain a constant temperature of 123° F.

The cation resin is put on the ammonium cycle by downflow treatment, at a rate equivalent to 0.5 gal. per min. per cu. ft. of resin, with a 5% aqueous ammonium hydroxide solution, until it is completely exhausted; the anion resin is activated in a similar manner with 15 pounds of sodium hydroxide in 5% solution per cu. ft. of resin.

Lime-clarified raw cane sugar remelt is heated to 123° F. and then, at a rate of 1.4 gals. per min. per cu. ft. of cation resin, is passed through the cation and anion resin beds in that order. The results obtained follow:

Brom Thymol Blue alkalinity titrations (a measure of free ammonium hydroxide in the effluent) are made to determine the anion capacity of the demineralization system. Theoretically, the Brom Thymol Blue alkalinity (expressed as CaCO$_3$) of the effluent should equal the total cations (expressed as CaCO$_3$) in the influent if complete exchange of the cations and anions for ammonium hydroxide is being effected. A drop in the alkalinity titration without a corresponding leakage of those cations found in the influent sugar solution would indicate anion leakage.

From the results tabulated above, it will be seen that a cation capacity of 8.8 kilograins as CaCO$_3$ per cu. ft. of cation resin is obtained to a 6.6 P. P. M. as CaCO$_3$ total measurable cation breakthrough, and an anion capacity of 5.8 kilograins as CaCO$_3$, based on anions equivalent to measurable cations in the influent, per cubic foot of anion resin is obtained before an appreciable drop in alkalinity occurs. There is no inversion of sucrose during the run.

| Time, mins. | Liters through | Brix | Na, P. P. M. | K, P. P. M. | Hardness, P. P. M. | Percent Invert (dry basis) | Capacity (kilograins per cu. ft. as CaCO$_3$) |
|---|---|---|---|---|---|---|---|
| ---- | ---- | 48.5 | 15 | 6 | 580 | 0.21 | ------ |
| 60 | 2.2 | 48.1 | 0 | 0 | 0 | 0.20 | 2.91 |
| 120 | 4.4 | 48.1 | 0 | 0 | 0 | 0.21 | 5.82 |
| 195 | 7.4 | 46.8 | 14 | 8 | 28 | 0.19 | 9.72 |

Thus the cation capacity of the system, to a breakthrough of 28 P. P. M. hardness, is 9.72 kilograins as CaCO$_3$ per cu. ft. of resin which is excellent capacity for a two-bed system processing

EXAMPLE 3

Example 2 is repeated except that the anion resin is regenerated with 15 pounds of sodium hydroxide as a 5% solution per cu. ft. of resin and a flow rate of 1.15 gals. per min. per cu. ft. of cation resin in maintained. The following results are observed:

| Time (mins.) | Liters through | Brix | Na, P. P. M. | K, P. P. M. | Hardness, P. P. M. | Per Cent Invert (dry basis) | Brom Thymol Blue Alkalinity (P. P. M. as CaCO₃) | Capacity (kilograins per cu. ft. as CaCO₃) |
|---|---|---|---|---|---|---|---|---|
| raw | ----- | 44.27 | 10 | 5 | 458 | 0.21 | 41 | -------- |
| 54 | 1.5 | ------ | 0 | ------ | ------ | ------ | 610 | ------ |
| 84 | 2.0 | ------ | ------ | ------ | ------ | ------ | 665 | ------ |
| 129 | 3.0 | ------ | 0 | ------ | ------ | ------ | 640 | ------ |
| 159 | 4.1 | ------ | ------ | ------ | ------ | ------ | 635 | ------ |
| 189 | 5.1 | ------ | 0 | ------ | ------ | ------ | 590 | ------ |
| 219 | 6.1 | ------ | 0 | ------ | ------ | ------ | 560 | ------ |
| 234 | 6.6 | ------ | ------ | ------ | ------ | ------ | 580 | 6.82 |
| 249 | 7.1 | ------ | 1.5 | ------ | ------ | ------ | 505 | 7.32 |
| 264 | 7.6 | ------ | 2 | ------ | 1 | ------ | 445 | 7.83 |
| 279 | 8.3 | ------ | 4 | ------ | 2 | ------ | 410 | 8.56 |
| 299 | 8.8 | ------ | 7 | ------ | 4.2 | ------ | 370 | 9.07 |
| 314 | 9.7 | ------ | 12 | ------ | 5.5 | 0.19 | 310 | 10.0 |

The cation capacity of 8.56 kilograins as CaCO₃ to a breakthrough of 6 P. P. M. measurable cations checks with the result of Example 2, and the use of 15 pounds of regenerant instead of 10 pounds as in Example 2 does not produce a more noticeable change in the Brom Thymol Blue alkalinity. Again there is no inversion.

EXAMPLE 4

A four-bed system is provided. The first pair of beds comprises the two used in Examples 1–3, the cation resin being regenerated with 15 pounds of ammonium chloride as a 5% aqueous solution per cubic foot of resin and the anion resin, with 10 pounds of sodium hydroxide as a 5% aqueous solution per cu. ft. of resin. The third bed is raw cation resin of the same type as in bed No. 1 put on the ammonium cycle by first completely activating with sulfuric acid solution and then completely exhausting with ammonium hydroxide solution. The fourth bed is anion resin of the same type as in bed No. 2 regenerated with 10 pounds of sodium hydroxide as a 5% aqueous solution per cu. foot of resin.

Sugar remelt as in Example 1 is passed through the above-described four-bed system at a flow rate of 1.2 gals. per min. per cu. ft. of cation resin in bed No. 1 with the following results:

The effluents from Examples 1–4, inclusive, are greatly improved over the influents in color and odor. The capacities of the systems employed in the processing of the sugar remelt are in general practically identical with those obtained using cation resin on the hydrogen cycle and in addition, when cation resin is employed on the ammonium cycle, no inversion of sucrose occurs.

In Examples 2–4, greater alkalinity as determined by Brom Thymol Blue titration is obtained in the effluent than there were measurable cations in the influent. This increase may be attributed to the presence in the influent of cations other than measurable cations and/or to a slight solubility of the activated anion resin used. At any rate, while anion capacity cannot therefore be accurately measured by alkalinity titration, an indication of anion capacities nearly comparable to the cation capacities is possible.

Substantially the same results with only slightly lower capacity are obtained if anion resin "A–1" is substituted for anion resin "A" of Examples 1–4.

EXAMPLE 5

A series of ammonium cycle runs is conducted on sugar cane juice as follows: Ten runs are made using a cation-anion two-bed system, each bed being retained in a four-inch diameter glass column, and one run is made using an alternate cation-anion six-bed system, each bed containing five cubic feet of resin. Both resins are of the same type as used in Examples 1–4.

| Time (mins.) | Liters through | Brix | Na, P. P. M. | K, P. P. M. | Hardness, P. P. M. | Brom Thymol Blue Alkalinity (P. P. M. as CaCO₃) | Capacity (kilograins per cu. ft. as CaCO₃) |
|---|---|---|---|---|---|---|---|
| raw | -------- | 45.35 | 10 | 5 | 470 | 40 | -------- |
| 30 | 1.0 | ------ | ------ | ------ | ------ | 710 | ------ |
| 60 | 2.0 | ------ | ------ | ------ | ------ | 830 | ------ |
| 88 | 3.0 | ------ | ------ | ------ | ------ | 825 | ------ |
| 116 | 4.1 | ------ | ------ | ------ | ------ | 790 | ------ |
| 146 | 5.1 | ------ | 0 | ------ | ------ | 920 | ------ |
| 183 | 6.1 | ------ | ------ | ------ | ------ | 710 | ------ |
| 222 | 7.2 | ------ | 0 | ------ | ------ | 780 | ------ |
| 246 | ------ | ------ | ------ | ------ | ------ | ------ | 3.8 |
| Bed #2 | 7.8 | ------ | ------ | ------ | ------ | ------ | ------ |
| 256 | 8.2 | ------ | 3 | ------ | ------ | 320 | ------ |
| 291 | 9.2 | ------ | ------ | ------ | ------ | 850 | 4.33 |
| Bed #2 | 9.2 | ------ | ------ | ------ | ------ | 865 | 4.86 |
| 326 | 10.2 | ------ | 9 | 6.2 | 6.2 | 305 | ------ |
| 356 | 11.2 | ------ | 1 | ------ | ------ | 620 | 5.4 |
| 391 | 12.3 | ------ | 1.5 | ------ | ------ | 660 | ------ |
| 431 | 13.3 | ------ | 1.5 | ------ | ------ | 580 | 6.50 |
| 461 | 14.4 | ------ | 1.0 | ------ | ------ | 620 | 7.05 |
| Bed #2 | 14.4 | ------ | 1.0 | ------ | ------ | 630 | 7.62 |
| 496 | 15.4 | ------ | 16 | 22 | 39.6 | 130 | ------ |
| 526 | 16.5 | ------ | 1.5 | ------ | ------ | 610 | 8.13 |
| Bed #2 | 16.6 | ------ | 2.5 | ------ | ------ | 525 | 8.72 |
| 561 | 17.6 | ------ | 18 | 21 | ------ | 75 | ------ |
| 596 | 18.7 | ------ | 3 | 2 | ------ | 470 | 9.3 |
| Bed #2 | 18.8 | ------ | 5 | ------ | ------ | 365 | 9.88 |
| 624 | 19.9 | ------ | 13 | 5 | 305 | 50 | ------ |
| 661 | 21.0 | ------ | 8 | ------ | 4.5 | 325 | 10.52 |
|  |  |  | 11 |  | 28.6 | 300 | 11.1 |

Both centrifuged raw cane juice and lime clarified juice are used in the runs. The measurable ash content (potassium, sodium and soap hardness) of both types juice is about 3000 P. P. M. as CaCO₃. The acidity of the raw juice varies from 500 to 1000 P. P. M. as CaCO₃ and the per cent invert, from 4% to 12% based on dry solids. The lime clarified juice is treated at 30°–33° C. and the raw centrifuged juice, at 20°–25° C.

All runs are made at a flow rate of 1 gal. per min. per cu. ft. of cation resin used. Regeneration is carried out at a rate of 0.5 gal. per min. per cu. ft. of resin and the strengths of the regenerant solutions vary between 4% and 6%. The cation exchangers are regenerated with 5 pounds of ammonium chloride per cu. ft. of resin and then rinsed free of sodium which is present on the exhausted resin and in the water. The anion exchangers are regenerated with 4 pounds of sodium hydroxide per cu. ft. of resin and rinsed with raw water to the sodium content of the raw water.

A. *Non-sugar removal*

The non-sugar content of the raw juice, based on dry substance, averages 15.82% and that of the treated juice averages 7.09%. This represents a 55.18% average non-sugar removal. The same raw juice has an average apparent purity of 76.42% and the treated juice, one of 82.55%.

The apparent purity of the treated sugar solution is raised by concentration to eliminate the ammonia contained therein as a result of the ion exchange process. Thus in one run, the non-sugar content of a treated lime clarified juice containing 6.47% non-sugars decreases to 3.63% upon concentration of the juice of 56.6 Brix.

Accordingly, there is substantial non-sugar removal and increased apparent purity when raw cane juice is treated using cation exchangers on the ammonium cycle, and it should be remembered that this is unaccompanied by any inversion of sucrose present.

B. *Cation capacity*

Cation capacities, based on measurable cations, both as to lime clarified juice and centrifuged raw juice are found to be similar to those obtained upon use of cation exchangers on the hydrogen cycle. Figures for five of the runs follow:

| Capacity Kilograins as CaCO₃ per cu. ft. of resin to potassium breakthrough | Capacity Kilograins as CaCO₃ per cu. ft. of resin | Per Cent Total Cation Breakthrough |
| --- | --- | --- |
| 6.751 | 10.33 | 56 |
| 7.069 | 9.769 | 67 |
| [1] 10.210 | 10.659 | 17 |
| 9.135 | | |
| 8.657 | | |

[1] Lime clarified juice.

C. *Inversion*

The precent invert sugar based on dry substance is determined for the raw and treated juices of each run by means of the Lane and Eynon general volumetric method. In each run a composite of the raw and a composite of the effluent to a potassium breakthrough are taken and evaluated promptly or refrigerated until time for analysis. Variations in the following data are believed to be caused by the sampling technique and delays in making the analyses:

*Percent invert sugar*

| Based on Dry Substances | | Based on Sugars | |
| --- | --- | --- | --- |
| Raw | Treated | Raw | Treated |
| 6.06 | 7.37 | | |
| 12.5 | 11.6 | | |
| 11.2 | 11.05 | | |
| 8.2 | 8.83 | | |
| 8.7 | 6.8 | | |
| [1] 5.8 | 6.1 | 6.2 | 6.23 |
| [1] 8.7–7.12 | 9.03 | 9.78–7.88 | 9.27 |

(six bed)

[1] Lime-clarified juice.

Inversion, it is seen, can be held to a minimum by treating sugar cane juice with cation exchangers on the ammonium cycle.

Preparation of anion resin "A–1"

203 parts of tetraethylene pentamine (1.1 mols.)
297 parts of epichlorohydrin (3.2 mols.)
500 parts of water The tetraethylene pentamine is charged into a suitable reaction vessel provided with an agitator and means for cooling the vessel. The water is added to the tetraethylene pentamine, the resulting solution is cooled to about 44° to 47° C., and the epichlorohydrin is added slowly while the reaction mixture is being continuously agitated and kept at a temperature between 44° and 47° C. After all the epichlorohydrin has been added, the resulting syrup is maintained at a temperature of about 50° C. for about 8 hours.

The gelled syrup is then heated or cured at a temperature of about 95° to 105° C. for 17–18 hours. The cured resin is ground and screened and the 20–40 mesh material retained.

Runs on centrifuged raw cane juice effected no perceptible color removal. However, when lime-clarified raw cane juice or raw sugar remelt was used as the influent, color removal was very good.

The demineralized sugar solution obtained according to our process may be treated in a variety of ways. It may be evaporated to the desired Brix and used as such as a syrup or, if necessary, purified by treatment with decolorizing carbon, by defecation, by filtration, or the like before use as a syrup. Similarly, without concentration, the effluent sugar solution may be defecated, filtered or treated with decolorizing carbon, any combination of these steps taking place in any order, and sugar crystallized from the treated solution. In general, the extent of after-treatment necessary depends upon the use to which the treated sugar solution is to be put, the source of the original sugar solution, i. e., sugar cane, beets or the like, the nature of the influent sugar solution, i. e., raw or clarified juice or the like.

If the cation resin to be put on the ammonium cycle is already on the hydrogen cycle, mere treatment with ammonia will effect the exchange. If, however, the resin is exhausted, for example to sodium, this simple conversion cannot be effected to any significant extent. In such a case it is desirable to first activate the resin with acid and then treat it with ammonia or the exhausted resin may, if desired, be treated directly with an ammonium salt such as ammonium chloride, bicarbonate, carbonate, sulfate, nitrate, phosphate, etc.

As a result of the process of the present invention an effluent sugar solution containing ammonia is obtained. The ammonia may be easily removed by heating and, if desired, it may after removal and concentration be used as such to regenerate further beds of hydrogen-activated cation exchangers or it may be used in the preparation of ammonium salts for regeneration of either hydrogen-activated or exhausted cation exchangers. This constitutes a tremendous practical advantage of our invention.

Other anion resins which may be employed in the process of the present invention include: acetaldehyde, formaldehyde, polyalkylene polyamine condensation products; condensation products of acrylonitrile-ammonocarbonic acid adduct and polyamines (copending application of James R. Dudley, Serial No. 651,375, filed March 1, 1946, now Patent No. 2,473,498, dated June 21, 1949); of aminotriazine, aldehyde and guanido compounds; of aminotriazine, aldehyde and strongly-basic non-aromatic amines (copending application of James R. Dudley, Serial No. 649,127, filed February 20, 1946, now Patent No. 2,529,142, dated November 7, 1950); and of biguanide, aldehyde and urea- or melamine-aldehyde condensation product as described in Swain Patent No. 2,251,234; biguanide-carbonyl and aldehyde condensation products; condensation products of crotonaldehyde, formaldehyde and polyalkylene polyamines; of epichlorohydrin and alkylene polyamines (copending application of James R. Dudley and Lennart A. Lundberg, Serial No. 616,644, filed September 15, 1945, now Patent No. 2,469,683, dated May 10, 1949); of polyepoxy compounds and alkylene polyamines (copending application of James R. Dudley, Serial No. 655,005, filed March 16, 1946, now Patent No. 2,469,684, dated May 10, 1949); and of furfural and guanido-carbonyl condensation products (copending application of James R. Dudley, Serial No. 703,489, filed October 16, 1946, now Patent No. 2,515,116, dated July 11, 1950); furyl aliphatic amine-aldehyde condensation products (copending application of James R. Dudley, Serial No. 642,416, filed January 19, 1946, now Patent No. 2,525,480, dated October 10, 1950); condensation products of glycerol dichlorhydrin and alkylene polyamines (copending application of Lennart A. Lundberg, Serial No. 624,606, filed October 25, 1945, now Patent No. 2,469,693, dated May 10, 1949); guanido-aldehyde, urea, etc., aldehyde condensation products; guanido-ketone, urea, etc., aldehyde condensation products (copending application of James R. Dudley, Serial No. 703,487, filed October 16, 1946, now Patent No. 2,522,668, dated September 19, 1950); guanyl urea, aldehyde, urea, etc., aldehyde condensation products; phenyl biguanide, aldehyde, urea, etc., aldehyde condensation products; condensation product of polyacrylic acid and polyamines; polyamine-aldehyde, urea-formaldehyde condensation products; polyamine-aldehyde, aminotriazine-formaldehyde condensation products (copending application of James R. Dudley, Serial No. 633,359, filed December 8, 1945, now Patent No. 2,521,664, dated September 5, 1950); condensation product of bifunctional triazines and polyalkylene polyamines (copending application of James R. Dudley, Serial No. 638,462, filed December 29, 1945, now Patent No. 2,467,523); phenol, formaldehyde and tetraethylene pentamine condensation products as described in U. S. Patents Nos. 2,402,384 and 2,341,907; phenol, formaldehyde, tetraethylene pentamine and epichlorhydrin condensation products, etc. Of these we prefer anion exchangers of the epichlorohydrin-polyalkylene polyamine type resin "A-1," and of the melamine-guanidine-formaldehyde type, resin "A."

Other cation materials which are useful in the process of the present invention include: bisphenol, sulfite and formaldehyde condensation products (copending application of Harold M. Day and Ronald L. De Hoff, Serial No. 676,096, filed June 11, 1946, now Patent No. 2,522,569, dated September 19, 1950); condensation products of furfural and mineral acid halides as described in Dudley Patent No. 2,408,615; sulfonated or phosphonated resinified furfural condensation products (copending application of Jack T. Thurston, Serial No. 652,235, filed March 5, 1946, now Patent No. 2,525,247, dated October 10, 1950); furyl sulfonate-aldehyde condensation products as described in U. S. Patent No. 2,372,233; bisphenol sulfone, sulfite and formaldehyde condensation products (copending application of Harold M. Day, Serial No. 694,817, filed September 4, 1946, now Patent No. 2,497,054, dated February 7, 1950); sulfonated hydroxy-aromatic aldehyde condensation products with ketone group (copending application of Jack T. Thurston, Serial No. 541,480, filed June 21, 1944, now Patent No. 2,440,669, dated April 27, 1948); nuclear sulfonate, phenol and aldehyde condensation products as described in U. S. Patents Nos. 2,204,539, 2,230,641 and 2,361,754; omega sulfonated, phenol-formaldehyde condensation products as described in U. S. Patents Nos. 2,228,159 and 2,228,160; sulfonated coal and other carbonaceous materials as described in U. S. Patents Nos. 2,191,063, 2,205,635, 2,191,060 and 2,206,007; and polyhydric phenol-aldehyde condensation products as described in U. S. Patent No. 2,104,501.

It is an advantage of the present invention according to which the cation exchanger in a sugar purification ion exchange process is operated on an ammonium cycle that neither the solution nor the resin is at an acid pH. It will thus be seen that the process of the present invention is peculiarly advantageous not only in sugar purification processes but also in processes for the demineralization of other acid-sensitive materials such as, for example, proteins which precipitate readily at their iso-electric points.

Still another advantage of the process of the present invention resides in the fact that no inversion or substantially no inversion of the sucrose contained in the sugar solution takes place. This effects, of course, a large saving economically.

It is another advantage of the present invention that sugar solutions may be substantially completely demineralized by the operation of its process. This is particularly true when an anion resin of the type designated in the examples as anion resin "A" is used in conjunction with the ammonium-activated cation resin since anion resins of that type are superior salt splitters and therefore readily split the ammonium salt present in the sugar solution as it flows from the cation exchanger into the anion exchanger. In general, ammonium salts split more readily than metallic salts such as for example sodium salts, and this again is an advantage of the use of cation exchangers on the ammonium cycle.

It is an additional advantage of the present invention that it may be applied to the purification of any sugar solutions. Examples of such sugar solutions include molasses, affination liquors, sugar cane juices, sugar beet juices, sorghum juices, glucose solutions such as corn syrups, maltose syrups, etc., fruit juices such as those of grapefruit, pineapple, apple, etc., maple sugar solutions, solutions of polysaccharides, etc.

In addition, the process of the present invention may be applied to other ion exchange purification processes. We have already mentioned its applicability in the demineralization or recovery of proteins or solutions containing acid sensitive proteins.

We claim:

1. A process which comprises bringing an aqueous solution containing sugar into contact with a pair of cation and anion exchangers in that order, said cation exchanger having previously been substantially completely activated with ammonium ions and said anion exchanger being hydroxyl activated, and separating the solution from said exchangers.

2. A process which comprises passing an aqueous solution containing sugar through a bed of cation exchange resinous material which has been substantially completely activated with ammonium ions and then through a bed of hydroxyl activated anion exchange resinous material whereby a sugar solution of substantially the same invert sugar content as the influent sugar solution is obtained as the effluent.

3. A process according to claim 2 in which the aqueous solution containing sugar is a raw sugar remelt.

4. A process according to claim 2 in which the aqueous solution containing sugar is a sugar cane juice.

5. A process according to claim 2 in which the cation exchange resinous material has been substantially completely activated with ammonium ions by treatment of hydrogen-activated cation exchange resinous material with ammonium hydroxide.

6. A process according to claim 2 in which the cation exchange resinous material has been substantially completely activated with ammonium ions by treatment of cation exchange resinous material with an aqueous solution of an ammonium salt.

7. A process according to claim 2 in which the anion exchange resinous material is a guanidine-melamine-formaldehyde condensation product.

8. A process according to claim 2 in which the anion exchange resinous material is an epichlorohydrin-polyalkylene polyamine condensation product.

9. A process which comprises passing a sugar juice through a bed of cation exchange resinous material on the ammonium cycle and then through a bed of hydroxyl activated anion exchange resinous material capable of removing anions from solution and concentrating the effluent solution containing sugar whereby the ammonium hydroxide contained therein is driven off.

10. A process which comprises passing a sugar juice through a bed of cation exchange resinous material on the ammonium cycle and then through a bed of hydroxyl activated anion exchange resinous material capable of removing anions from solution, concentrating the effluent solution containing sugar whereby the ammonium hydroxide contained therein is driven off, and crystallizing sugar from the concentrated effluent solution.

11. A process which comprises passing an aqueous solution containing sugar through a bed of cation exchange resinous material on the ammonium cycle and then through a bed of hydroxyl activated anion exchange resinous material capable of removing anions from solution, concentrating the effluent solution containing sugar to drive off the ammonium hydroxide contained therein, recovering the ammonium hydroxide so driven off, and using the recovered ammonium hydroxide for regeneration of the cation exchange resinous material.

HAROLD M. DAY.
ARTHUR C. WROTNOWSKI, JR.

REFERENCES CITED

The following references are of record in the file of this patent:

UNITED STATES PATENTS

| Number | Name | Date |
| --- | --- | --- |
| 2,067,362 | Von Steitz | Jan. 12, 1937 |
| 2,104,959 | Von Steitz | Jan. 11, 1938 |
| 2,171,408 | Smit | Aug. 29, 1939 |
| 2,288,547 | Pattock | June 30, 1942 |
| 2,388,194 | Vallez | Oct. 30, 1945 |

FOREIGN PATENTS

| Number | Country | Date |
| --- | --- | --- |
| 542,846 | Great Britain | Jan. 29, 1942 |
| 805,092 | France | Nov. 10, 1936 |

OTHER REFERENCES

Fitzwilliam, Int. Sugar Jour., March 1, 1947, pages 69–73.